United States Patent
Song et al.

(10) Patent No.: US 11,597,465 B2
(45) Date of Patent: Mar. 7, 2023

(54) SEAT HEIGHT ADJUSTING DEVICE FOR A VEHICLE AND VEHICLE INCLUDING THE SAME

(71) Applicants: Hyundai Motor Company, Seoul (KR); Kia Motors Corporation, Seoul (KR)

(72) Inventors: Ilsun Song, Seongnam-si (KR); Donghee Seok, Suwon-si (KR); Duck Young Kim, Seongnam-si (KR); Hee Jin Ro, Seoul (KR); Yocheol Jang, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 54 days.

(21) Appl. No.: 17/214,005

(22) Filed: Mar. 26, 2021

(65) Prior Publication Data
US 2022/0097793 A1 Mar. 31, 2022

(30) Foreign Application Priority Data
Sep. 28, 2020 (KR) .......................... 10-2020-0125836

(51) Int. Cl.
*B62K 19/36* (2006.01)
*F16H 1/14* (2006.01)
*F16H 25/20* (2006.01)
*B62J 1/08* (2006.01)
(Continued)

(52) U.S. Cl.
CPC .............. *B62K 19/36* (2013.01); *F16D 11/14* (2013.01); *F16H 1/14* (2013.01); *F16H 25/20* (2013.01); *B62J 2001/085* (2013.01); *F16H 25/2454* (2013.01)

(58) Field of Classification Search
CPC ....... B62K 19/36; B62J 2001/085; B62J 1/06; F16D 11/14; F16D 2121/14; F16D 2121/20; F16H 1/14; F16H 25/20
See application file for complete search history.

(56) References Cited

U.S. PATENT DOCUMENTS

| | | | | |
|---|---|---|---|---|
| 5,390,946 A | * | 2/1995 | Spicer | B62M 23/00 280/260 |
| 2006/0081076 A1 | * | 4/2006 | Otaki | F16D 65/18 74/89.4 |

(Continued)

FOREIGN PATENT DOCUMENTS

| | | | | | |
|---|---|---|---|---|---|
| KR | 20030042829 A | * | 6/2003 | ............... | B62J 1/06 |
| KR | 101799847 | * | 11/2017 | ............. | B62K 13/08 |
| KR | 20200057335 A | * | 5/2020 | ............... | B62J 1/06 |

*Primary Examiner* — Jacob B Meyer
*Assistant Examiner* — Hosam Shabara
(74) *Attorney, Agent, or Firm* — Slater Matsil, LLP

(57) ABSTRACT

A device for adjusting a seat height of a personal mobility includes a hollow seat frame extending in a longitudinal direction, a seat support shaft coupled to an upper portion of the seat frame and configured to slide upward and downward, a pedal shaft coupled to a lower portion of the seat frame, a lifting screw shaft extending downward in a state of being fixed to the seat support shaft inside the seat frame, and a rotation screw shaft fastened to the lifting screw shaft inside the seat frame and configured to raise and lower the lifting screw shaft by rotating based on operation of the pedal shaft.

13 Claims, 7 Drawing Sheets

(51) Int. Cl.
*F16H 25/24* (2006.01)
*F16D 11/14* (2006.01)

(56) References Cited

U.S. PATENT DOCUMENTS

2018/0111660 A1* 4/2018 Liu .......................... B62M 6/55
2019/0054968 A1* 2/2019 Kurokawa ............. B62M 9/132

* cited by examiner

SEAT HEIGHT ADJUSTING DEVICE FOR A VEHICLE AND VEHICLE INCLUDING THE SAME

CROSS-REFERENCE TO RELATED APPLICATIONS

This application claims the benefit of Korean Patent Application No. 10-2020-0125836, filed in the Korean Intellectual Property Office on Sep. 28, 2020, which application is hereby incorporated herein by reference.

TECHNICAL FIELD

The disclosure relates to a seat height adjusting device of a personal mobility and a personal mobility including the same.

BACKGROUND

In recent years, sharing services for renting a personal mobility such as an electric bicycle and an electric scooter are developing. This phenomenon is because when it is too close to move by car but it is difficult to walk, using an electric bicycle or the like can move easily and comfortably.

However, because heights and physical conditions are different depending on users, there are cases where the seat height of a shared personal mobility needs to be adjusted. In this case, the user adjusts the seat height by releasing the tightening of a seat height adjusting device while the personal mobility is stopped.

However, because the user must unfasten the seat while getting off the personal mobility, manually adjust the seat height, and then fix the seat again, it is difficult and cumbersome to adjust the seat height of such a seat height adjusting device.

SUMMARY

The disclosure relates to a seat height adjusting device of a personal mobility capable and a personal mobility including the same. Particular embodiments relate to a seat height adjusting device of a personal mobility capable of easily adjusting a seat height and a personal mobility including the same.

An embodiment of the disclosure provides a seat height adjusting device of a personal mobility capable of easy adjusting a seat height and a personal mobility including the same.

Another embodiment of the disclosure provides a seat height adjusting device of a personal mobility capable of allowing a user to adjust a seat height while on board and a personal mobility including the same.

Additional embodiments of the disclosure will be set forth in part in the description which follows and, in part, will be obvious from the description, or may be learned by practice of the disclosure.

In accordance with an embodiment of the disclosure, a seat height adjusting device of a personal mobility includes a hollow seat frame extending in a longitudinal direction, a seat support shaft coupled to an upper portion of the seat frame to slide upward and downward, wherein a seat is connected to the upper portion, a lifting screw shaft extending downward in a state of being fixed to the seat support shaft inside the seat frame, and a rotation screw shaft fastened to the lifting screw shaft inside the seat frame and configured to raise and lower the lifting screw shaft by rotating based on the operation of a pedal shaft installed at a lower portion of the seat frame.

The seat height adjusting device may further include a power transmission shaft extending from the rotation screw shaft side toward the pedal shaft side inside the seat frame and having a lower portion connected to the pedal shaft by a plurality of gears to rotate by rotation of the pedal shaft, and a power connection device configured to connect or disconnect the power transmission shaft and the rotation screw shaft.

The pedal shaft and the power transmission shaft may be disposed in a direction in which axes thereof cross each other, and the plurality of gears may include a driving bevel gear mounted on the pedal shaft and a driven bevel gear mounted on the power transmission shaft in a state of being engaged with the driving bevel gear.

The lifting screw shaft, the rotation screw shaft, and the power transmission shaft may be installed in the seat frame so that axes thereof are aligned.

The power connection device may include a clutch member configured to move in an axial direction of the rotation screw shaft and the power transmission shaft to connect or disconnect the rotation screw shaft and the power transmission shaft, and an electric actuator configured to move the clutch member to connect or disconnect the rotation screw shaft and the power transmission shaft.

The power connection device may include a clutch member configured to move in an axial direction of the rotation screw shaft and the power transmission shaft to connect or disconnect the rotation screw shaft and the power transmission shaft, and a manual operation device configured to move the clutch member to connect or disconnect the rotation screw shaft and the power transmission shaft.

The manual operation device may include a wire cable connected to the clutch member, an operation lever configured to operate to pull or release the wire cable, and a restoring spring configured to move the clutch member to a disconnection position.

In accordance with another embodiment of the disclosure, a seat height adjusting device of a personal mobility includes a hollow seat frame extending in a longitudinal direction, a seat support shaft coupled to an upper portion of the seat frame to slide upward and downward, wherein a seat is connected to the upper portion, a lifting screw shaft extending downward in a state of being fixed to the seat support shaft inside the seat frame, a rotation screw shaft fastened to the lifting screw shaft inside the seat frame and configured to raise and lower the lifting screw shaft by rotation, and a driving motor installed on the seat frame to rotate the rotation screw shaft.

In accordance with another embodiment of the disclosure, a personal mobility including the above-described seat height adjusting device may be provided.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF ILLUSTRATIVE EMBODIMENTS

Hereinafter embodiments of the disclosure will be described in detail with reference to the accompanying drawings. The embodiments described below are provided by way of example so that those skilled in the art will be able to fully understand the spirit of the disclosure. The disclosure is not limited to the embodiments described below, but may be embodied in other forms. In order to clearly explain the disclosure, parts not related to the description are omitted from the drawings, and the width, length, thickness, etc. of the components may be exaggerated for convenience.

Figure 1:
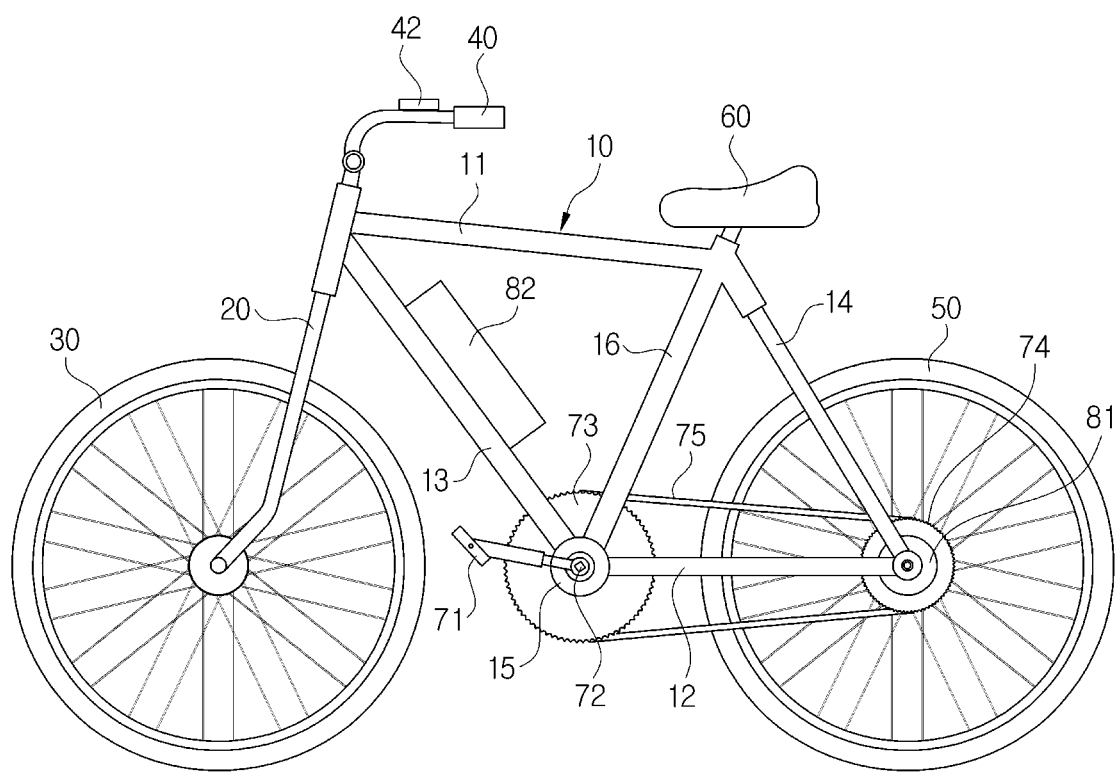
FIG. 1 illustrates a personal mobility to which a seat height adjusting device according to an embodiment of the disclosure is applied.

FIG. 1 illustrates a personal mobility to which a seat height adjusting device according to an embodiment of the disclosure is applied. Herein, although an electric bicycle with a pedal is presented as an example of a personal mobility, a personal mobility to which the seat height adjusting device of the disclosure may be applied is not limited thereto. The seat height adjusting device of the disclosure may be applied to various types of personal mobilities that require seat height adjustment.

Referring to FIG. 1, an electric bicycle may include a bicycle body 10 composed of a combination of a plurality of frames, a steering shaft 20 rotatably installed at a front end of the bicycle body 10, a front wheel 30 installed at a lower portion of the steering shaft 20, a steering handle 40 provided at an upper end portion of the steering shaft 20, a rear wheel 50 installed at a rear end portion of the bicycle body 10, a seat 60 installed at an upper side of the bicycle body 10, a driving sprocket 73 provided below a middle portion of the bicycle body 10 and rotating by pedals 71, and a driven sprocket 74 installed on a shaft of the rear wheel 50 and connected to the driving sprocket 73 by a chain 75, a driving motor 81 installed on the shaft of the rear wheel 50, and a battery 82 providing energy to the driving motor 81.

The electric bicycle may be driven by a user by operating the pedals 71 or driven by the operation of the driving motor 81 installed on the rear wheel 50.

An upper frame 11, a lower frame 12, a front inclined frame 13, and a rear inclined frame 14 of the bicycle body 10 may be connected in a rhombus shape. The bicycle body 10 may include a seat frame 16 extending in a longitudinal direction (diagonal direction) to connect the seat 60 and a pedal shaft support 15 in order to stably support the seat 60 while enhancing rigidity.

Figure 2:
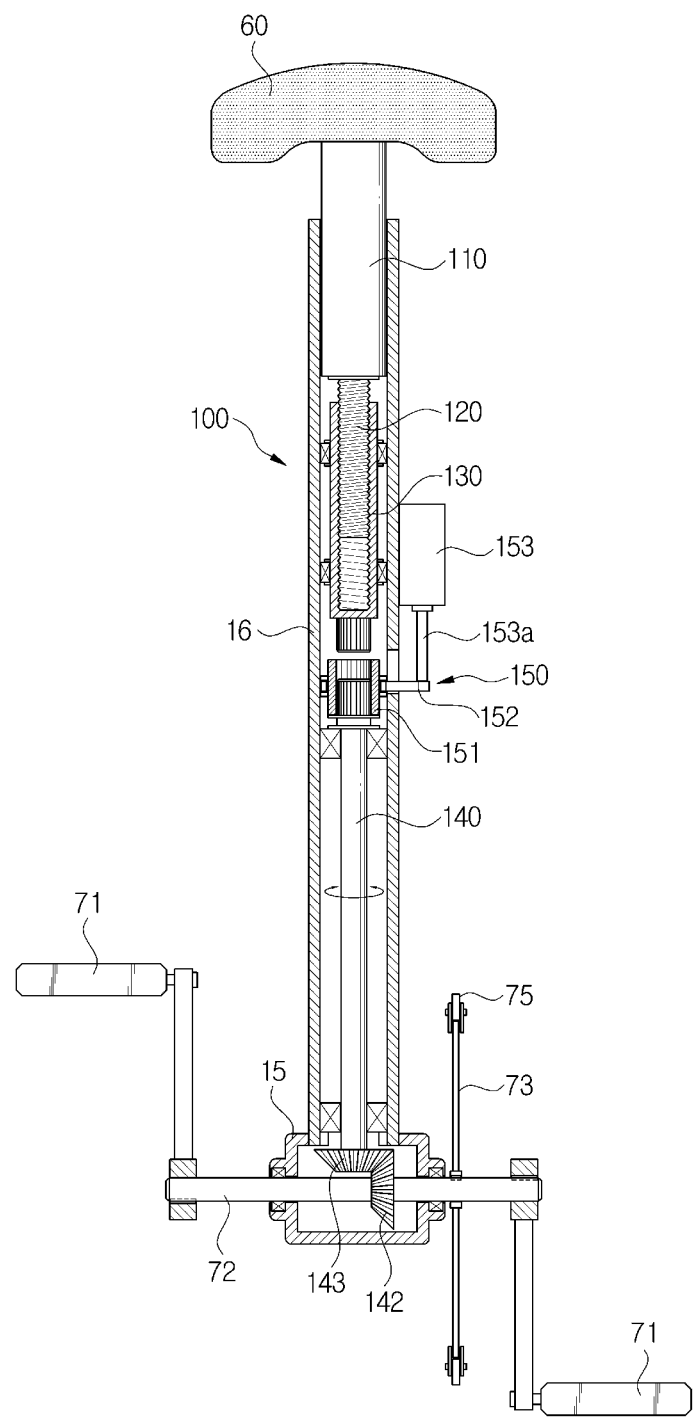
FIG. 2 illustrates the seat height adjusting device of the personal mobility according to a first embodiment of the disclosure, in a state in which power of a pedal shaft is normally separated.

FIG. 2 illustrates the seat height adjusting device of the personal mobility according to a first embodiment of the disclosure.

Referring to FIG. 2, the seat height adjusting device 100 may include the seat frame 16, a seat support shaft 110, a lifting screw shaft 120, a rotation screw shaft 130, a power transmission shaft 140, and a power connection device 150, which extend in the longitudinal direction to connect the seat 60 and the pedal shaft support 15.

The seat frame 16 is provided in the form of a hollow tube, and a lower end of the seat frame 16 is connected to the pedal shaft support 15 rotatably supporting a pedal shaft 72. The pedal shaft 72 may rotate by the operation of the pedals 71, which penetrate the pedal shaft support 15 in a transverse direction and are connected to both ends of the pedal shaft support 15, respectively, to rotate the driving sprocket 73. Therefore, an axial direction of the pedal shaft 72 and an axial direction of the seat frame 16 cross each other.

The seat support shaft 110 is slidably coupled to an upper portion of the seat frame 16, and the upper portion of the seat frame 16 is fixed to a lower portion of the seat 60. Therefore, the seat support shaft 110 may be raised and lowered together with the seat 60. The seat support shaft 110 may be installed to be raised and lowered in a state in which rotation thereof is restricted with respect to the seat frame 16 by a combination of a key and a key groove.

The lifting screw shaft 120 is installed inside the seat frame 16, has an upper end fixed to a lower end of the seat support shaft 110, and extends downward by a predetermined length along the axial direction of the seat frame 16. Therefore, the lifting screw shaft 120 may be raised and lowered together with the seat support shaft 110 in a state in which rotation thereof is restricted.

The rotation screw shaft 130 is fastened to the lifting screw shaft 120 inside the seat frame 16 and may raise and lower the lifting screw shaft 120 by rotation. The rotation screw shaft 130 may be a hollow shaft having female threads formed on an inner surface thereof, and an outer surface thereof may be rotatably supported on an inner surface of the seat frame 16 by a bearing or the like. The rotation screw shaft 130 may raise and lower the lifting screw shaft 120 by rotating in a state in which lifting thereof is restricted, and thus may raise and lower the seat support shaft 110 and the seat 60.

The power transmission shaft 140 extends from a lower portion of the rotation screw shaft 130 toward the pedal shaft 72 in the seat frame 16. The power transmission shaft 140 is installed in the seat frame 16 to have the same axis as the rotation screw shaft 130 and the lifting screw shaft 120. The power transmission shaft 140 has an upper end slightly spaced apart from a lower end of the rotation screw shaft 130 to maintain normally a state of being separated from the rotation screw shaft 130. The power transmission shaft 140 may be rotatably supported by a plurality of bearings whose outer surface is installed in the seat frame 16.

The power transmission shaft 140 has a lower portion connected to the pedal shaft 72 by a plurality of gears to rotate together when the pedal shaft 72 rotates. The plurality of gears may include a driving bevel gear 142 mounted on the pedal shaft 72, and a driven bevel gear 143 mounted on the power transmission shaft 140 in a state of being engaged with the driving bevel gear 142. The driving bevel gear 142 and the driven bevel gear 143 connect the pedal shaft 72 and the power transmission shaft 140 disposed in a direction in which axes thereof cross each other to rotate together. Therefore, when the user rotates the pedal shaft 72 by operating the pedals 71, the power transmission shaft 140 rotates together with the pedal shaft 72.

The power connection device 150 may connect or disconnect an upper portion of the power transmission shaft 140 and the lower portion of the rotation screw shaft 130. The power connection device 150 normally maintains a state in which the power transmission shaft 140 and the rotation screw shaft 130 are separated, and may connect the power transmission shaft 140 and the rotation screw shaft 130 when the user adjusts a height of the seat 60. When the power connection device 150 connects the power transmission shaft 140 and the rotation screw shaft 130, the rotation screw shaft 130 rotates when the pedal shaft 72 rotates. Accordingly, the user may adjust the height of the seat 60 by rotating the pedal shaft 72 to raise or lower the lifting screw shaft 120.

Referring to FIGS. 2 to 5, the power connection device 150 may include a clutch member 151, a connection member 152, and an electric actuator 153.

The clutch member 151 is provided in a cylindrical shape, and may have both sides of an inner surface connected to the rotation screw shaft 130 and an end of an outer surface of the power transmission shaft 140 in a serration or spline shaft connection method. For the coupling as described above, serrations or spline teeth that engage with each other may be formed on the inner surface of the clutch member 151, the rotation screw shaft 130, and the end of the outer surface of the power transmission shaft 140.

Figure 4:
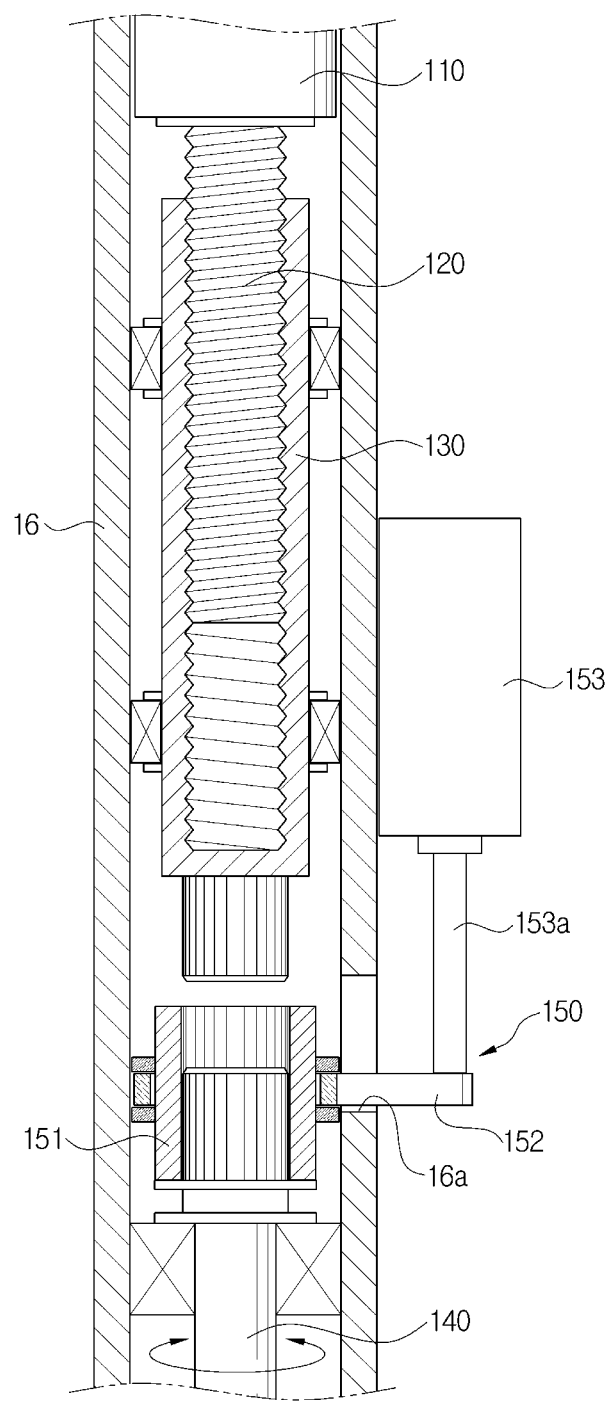
FIG. 4 is a detailed view of a power connection device in the seat height adjusting device of the personal mobility according to the first embodiment of the disclosure, in a state in which a clutch member is separated.
Figure 5:
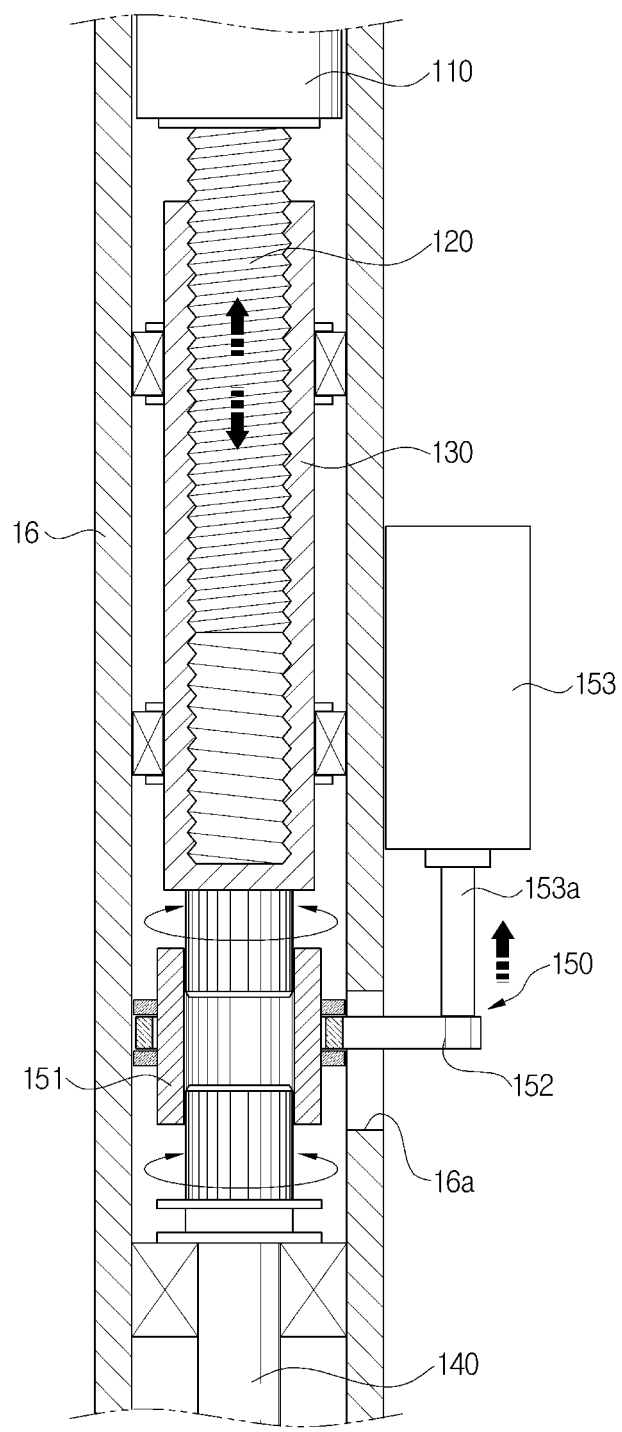
FIG. 5 is a detailed view of the power connection device in the seat height adjusting device of the personal mobility according to the first embodiment of the disclosure, in a state in which the clutch member is connected.

The clutch member 151 may move in the axial direction of the rotation screw shaft 130 and the power transmission shaft 140 to connect the rotation screw shaft 130 and the power transmission shaft 140 to enable power transmission or to disconnect the rotation screw shaft 130 and the power transmission shaft 140. As illustrated in FIG. 4, when the clutch member 151 moves downward, the rotation screw shaft 130 and the clutch member 151 are separated, thereby releasing the power connection. As illustrated in FIG. 5, when the clutch member 151 moves upward, both sides of the clutch member 151 are engaged with the power transmission shaft 140 and the rotation screw shaft 130, respectively, thereby connecting the power.

The connection member 152 is installed outside the clutch member 151 for the operation of the clutch member 151, and extends to the outside of the seat frame 16 through a passing hole 16*a* of the seat frame 16. The connection member 152 is rotatably coupled to an outer surface of the clutch member 151 to allow rotation of the clutch member 151.

The electric actuator 153 is mounted on an outer surface of the seat frame 16 and includes a moving rod 153*a* connected to the connection member 152. The electric actuator 153 may include a solenoid driver to advance and retreat the moving rod 153*a*. The electric actuator 153 may move the clutch member 151 in the axial direction by advancing and retreating the connection member 152, and thus may implement connection or disconnection between the rotation screw shaft 130 and the power transmission shaft 140.

As illustrated in FIG. 1, on the steering handle 40, an operation switch 42 through which the user may control the power connection device 150 to adjust the height of the seat 60 while sitting on the seat 60 may be provided.

Hereinafter, the operation and usage of the seat height adjusting device 100 will be described.

As illustrated in FIGS. 2 and 4, the power connection device 150 of the seat height adjusting device 100 normally maintains a state in which the clutch member 151 is separated from the rotation screw shaft 130. This state is maintained as it is as long as the user manipulates the operation switch 42 to operate the power connection device 150. Therefore, because the rotation screw shaft 130 does not rotate even when the user manipulates the pedals 71 while driving on the personal mobility, the height of the seat 60 does not change.

Because the seat support shaft 110 is a structure of raising and lowering in a state in which rotation thereof is restricted, and the lifting screw shaft 120 and the rotation screw shaft 130 are in a state of being coupled by threads, when the rotation screw shaft 130 is not rotated, the seat support shaft 110 is not raised and lowered even without the use of a separate binding pin.

Figure 3:
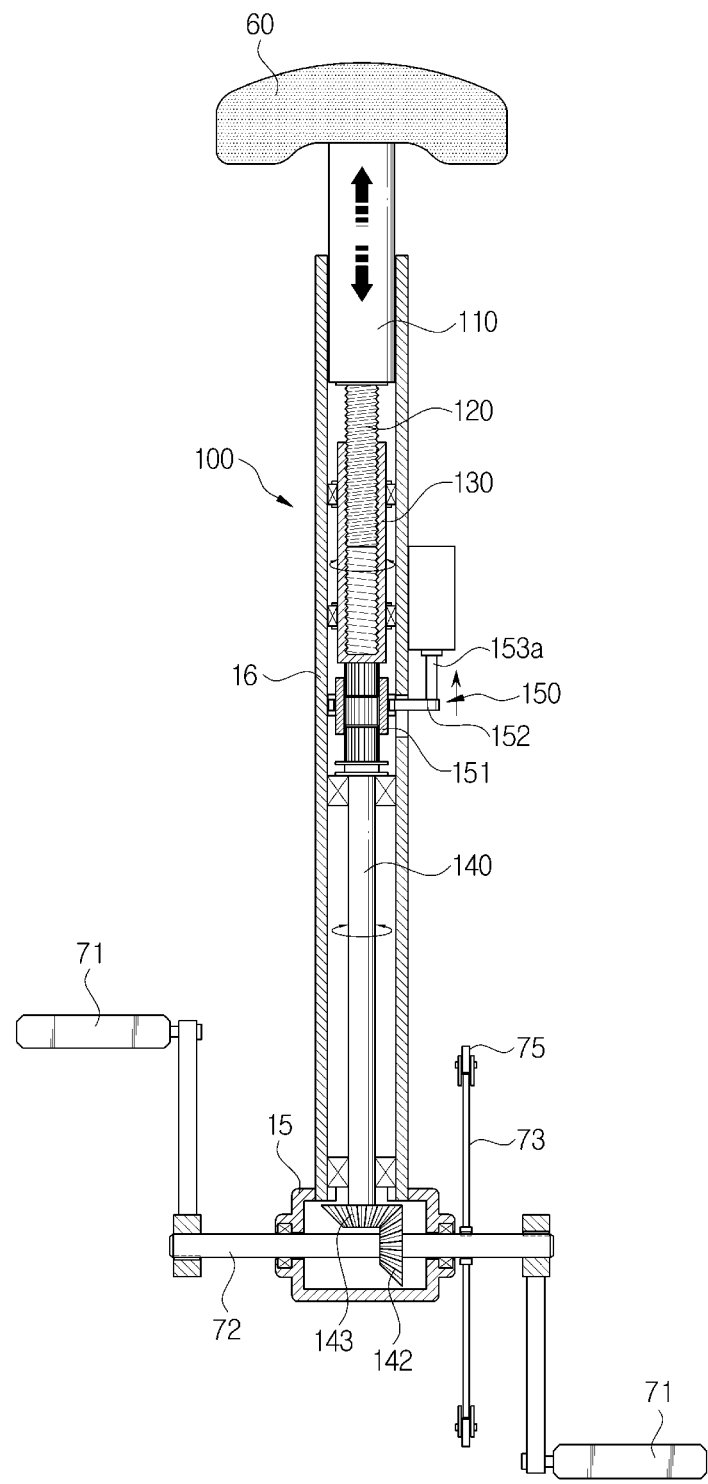
FIG. 3 illustrates the seat height adjusting device of the personal mobility according to the first embodiment of the disclosure, in a state in which the power of the pedal shaft is connected to adjust a seat height.

When the user intends to adjust the height of the seat 60, the user may operate the power connection device 150 by manipulating the operation switch 42 while sitting on the seat 60. Accordingly, as illustrated in FIGS. 3 and 5, the clutch member 151 moves in the axial direction by the operation of the electric actuator 153 to connect the power transmission shaft 140 and the rotation screw shaft 130.

In this state, when the user rotates the pedals 71, as the rotation of the pedal shaft 72 is transmitted to the power transmission shaft 140 and the rotation screw shaft 130, the lifting screw shaft 120 is raised and lowered, so that the height of the seat 60 may be adjusted.

Because the height adjustment of the seat 60 is determined depending on the rotation direction of the rotation screw shaft 130, the user may adjust the height of the seat 60 by rotating the pedals 71 forward or rearward as necessary. For example, when the user rotates the pedals 71 in a driving direction, the seat 60 may be raised, and when the user rotates the pedals 71 in the reverse direction, the seat 60 may be lowered.

Therefore, in the seat height adjusting device 100 of the present embodiment, the user may adjust the height of the seat 60 while gradually moving forward by stepping on the pedals 71 in a state of riding the personal mobility, or may adjust the height of the seat 60 in the driving process. In a typical electric bicycle, because power is not transmitted to the rear wheel 50 when the pedals 71 are rotated in reverse, the operation in either direction of raising or lowering the seat 60 is possible even when the personal mobility is stopped.

After the height adjustment of the seat 60 is completed, the user releases the connection of the power connection device 150 through the manipulation of the operation switch 42, so that the state in which the height of the seat 60 is adjusted may be maintained.

As such, in the seat height adjusting device 100 of the personal mobility according to the present embodiment, the user may easily adjust the height of the seat 60 in a state of ridding the personal mobility, and the height of the seat 60 may be adjusted even while the personal mobility is driven or stopped.

Figure 6:
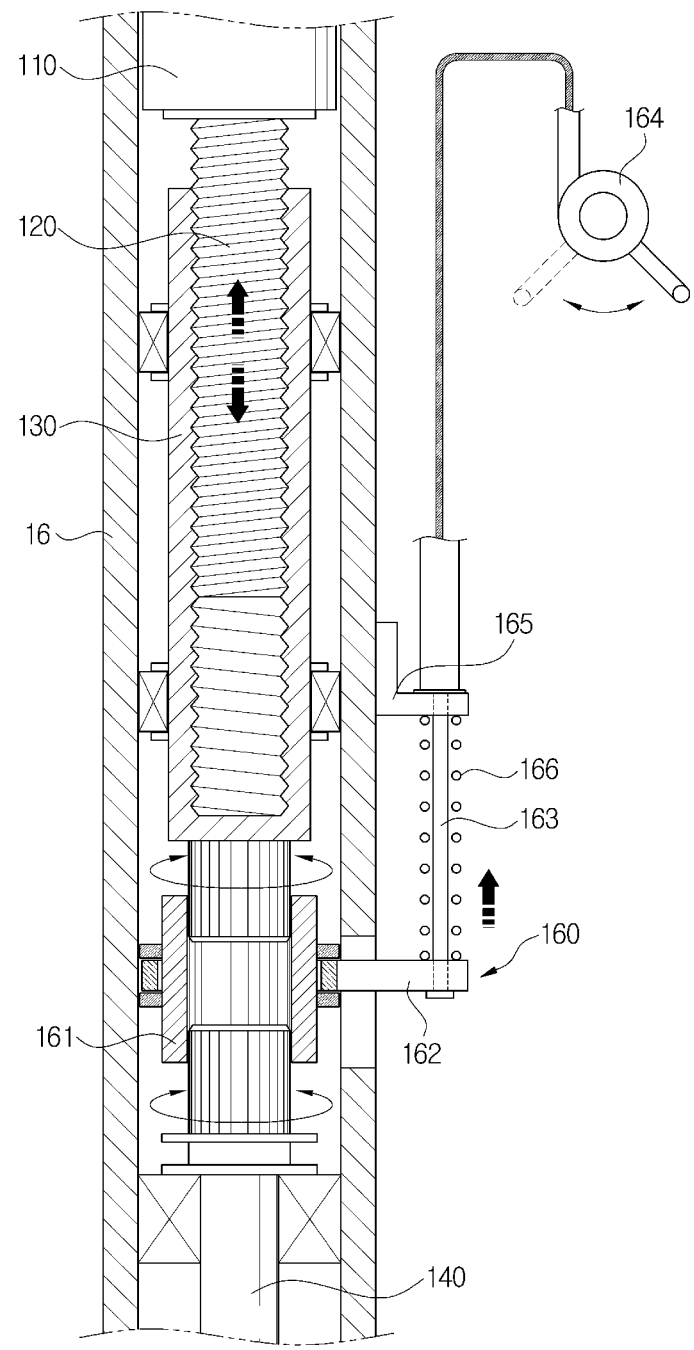
FIG. 6 illustrates a seat height adjusting device of a personal mobility according to a second embodiment of the disclosure.

FIG. 6 illustrates a seat height adjusting device of a personal mobility according to a second embodiment of the disclosure. In a seat height adjusting device of a second embodiment, a power connection device 160 includes a manual operation device capable of connecting or disconnecting the power transmission shaft 140 and the rotation screw shaft 130 by moving a clutch member 161 through a manual operation of a user.

The manual operation device may include a wire cable 163 connected to the clutch member 161 via a connection member 162, an operation lever 164 installed on the steering handle 40 or the like to pull or release the wire cable 163, and a restoring spring 166 installed between a cable support member 165 and the connection member 162 fixed to the outer surface of the seat frame 16 to normally move the clutch member 161 to a disconnection position.

When the user intends to adjust the height of the seat 60, the user may temporarily implement the connection of the power connection device 160 by manipulating the operation lever 164, and in this state, the user may adjust the height of the seat 60 by operating the pedals 71 in the same manner as in the first embodiment.

Because the clutch member 161 moves to its original position by a restoring force of the restoring spring 166 when the user releases the operation lever 164 after adjusting the height of the seat 60, the connection between the power transmission shaft 140 and the rotation screw shaft 130 may be released, and the seat 60 may be maintained in a state in which the height thereof is adjusted.

Figure 7:
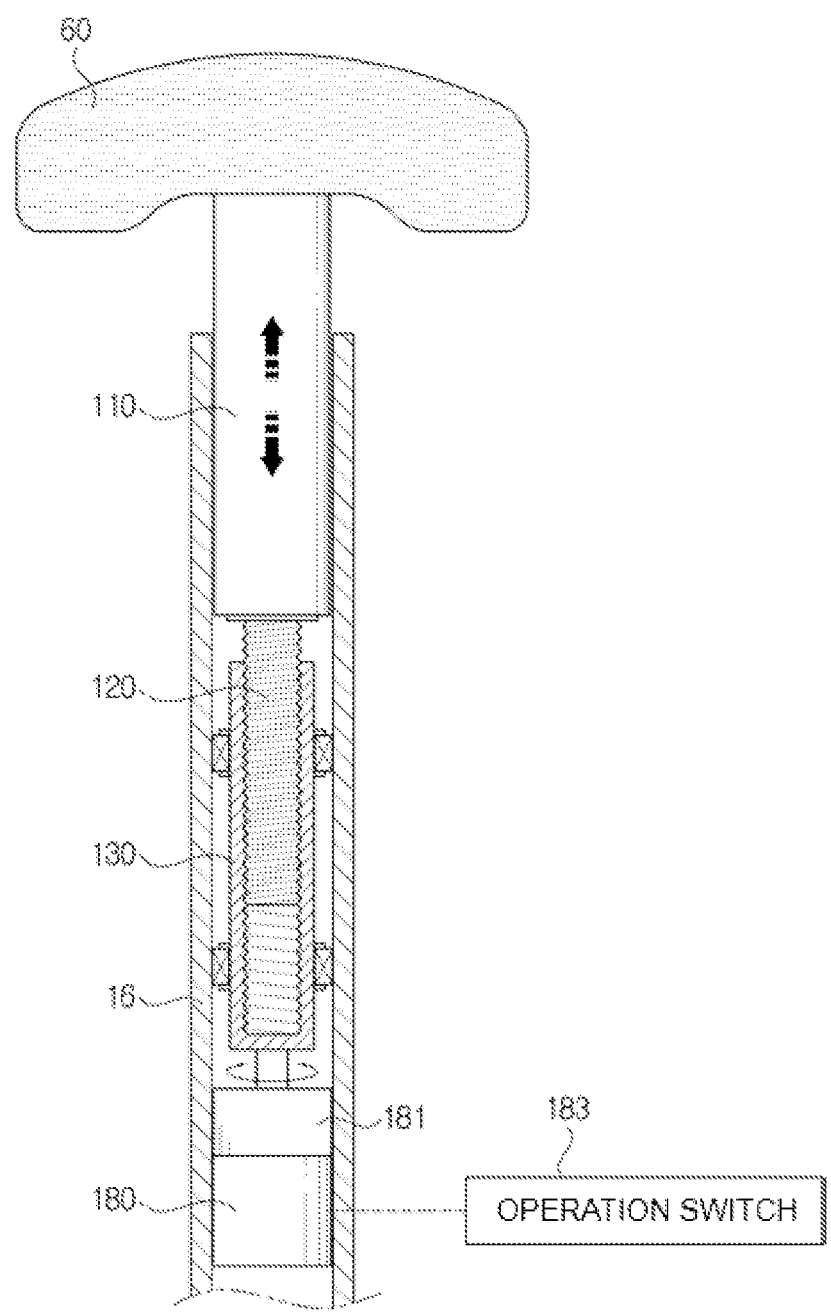
FIG. 7 illustrates a seat height adjusting device of a personal mobility according to a third embodiment of the disclosure.

FIG. 7 illustrates a seat height adjusting device according to a third embodiment of the disclosure. In the third embodiment, a seat driving motor 180 installed inside the seat frame 16 to rotate the rotation screw shaft 130 is provided. The seat driving motor 180 may rotate in a forward or reverse direction when a user operates the operation switch 183 in a direction in which the height of the seat 60 is raised or lowered. The seat driving motor 180 may include a reduction gear device 181 to rotate the rotation screw shaft 130 with a large force while being installed in the seat frame 16 by reducing the volume.

According to the third embodiment, the height of the seat 60 may be easily adjusted even when the user does not manipulate the pedal 71. According to the third embodiment, because the rotation screw shaft 130 rotates by the operation of the seat driving motor 180, the height of the seat 60 may be easily adjusted in various situations such as a riding state, a stationary state, and a running state.

As is apparent from the above, a seat height adjusting device of a personal mobility according to an embodiment of the disclosure can allow a user to easily adjust a seat height while riding the personal mobility, and also can allow the user to adjust the seat height even while the personal mobility is driven or stopped.

What is claimed is:

1. A device for adjusting a seat height, the device comprising:
    a seat frame extending in a longitudinal direction, the seat frame being hollow;
    a seat support shaft coupled to an upper portion of the seat frame and configured to slide upward and downward, wherein the upper portion of the seat frame is configured to be connected to a seat;
    a pedal shaft coupled to a lower portion of the seat frame;
    a lifting screw shaft extending downward and fixed to the seat support shaft inside the seat frame;
    a rotation screw shaft fastened to the lifting screw shaft inside the seat frame and configured to raise and lower the lifting screw shaft by rotating based on operation of the pedal shaft;
    a power transmission shaft extending from a rotation screw shaft side toward a pedal shaft side inside the seat frame and having a lower portion connected to the pedal shaft by a plurality of gears, the plurality of gears configured to rotate by rotation of the pedal shaft; and
    a power connection device configured to connect or disconnect the power transmission shaft and the rotation screw shaft.

2. The device according to claim 1,
    wherein the pedal shaft and the power transmission shaft are disposed in a direction in which axes thereof cross each other, and
    wherein the plurality of gears comprises a driving bevel gear mounted on the pedal shaft and a driven bevel gear mounted on the power transmission shaft when engaged with the driving bevel gear.

3. The device according to claim 1, wherein the lifting screw shaft, the rotation screw shaft, and the power transmission shaft are installed in the seat frame so that axes thereof are aligned.

4. The device according to claim 1, wherein the power connection device comprises:
    a clutch member configured to move in an axial direction of the rotation screw shaft and the power transmission shaft to connect or disconnect the rotation screw shaft and the power transmission shaft; and
    an electric actuator configured to move the clutch member to connect or disconnect the rotation screw shaft and the power transmission shaft.

5. The device according to claim 1, wherein the power connection device comprises:
    a clutch member configured to move in an axial direction of the rotation screw shaft and the power transmission shaft to connect or disconnect the rotation screw shaft and the power transmission shaft; and
    a manual operation device configured to move the clutch member to connect or disconnect the rotation screw shaft and the power transmission shaft.

6. The device according to claim 5, wherein the manual operation device comprises:
    a wire cable connected to the clutch member;
    an operation lever configured to operate to pull or release the wire cable; and
    a restoring spring configured to move the clutch member to a disconnection position.

7. A vehicle comprising:
    a vehicle body including a seat frame extending in a longitudinal direction, the seat frame being hollow;
    a seat support shaft coupled to an upper portion of the seat frame and configured to slide upward and downward;
    a seat connected to the upper portion of the seat frame;
    a pedal shaft coupled to a lower portion of the seat frame;
    a lifting screw shaft extending downward and fixed to the seat support shaft inside the seat frame;
    a rotation screw shaft fastened to the lifting screw shaft inside the seat frame and configured to raise and lower the lifting screw shaft by rotating based on operation of the pedal shaft;
    a power transmission shaft extending from a rotation screw shaft side toward a pedal shaft side inside the seat frame and having a lower portion connected to the pedal shaft by a plurality of gears, the plurality of gears configured to rotate by rotation of the pedal shaft; and
    a power connection device configured to connect or disconnect the power transmission shaft and the rotation screw shaft.

8. The vehicle according to claim 7,
    wherein the pedal shaft and the power transmission shaft are disposed in a direction in which axes thereof cross each other, and
    wherein the plurality of gears comprises a driving bevel gear mounted on the pedal shaft and a driven bevel gear mounted on the power transmission shaft in a state of being engaged with the driving bevel gear.

9. The vehicle according to claim 7, wherein the lifting screw shaft, the rotation screw shaft, and the power transmission shaft are installed in the seat frame so that axes thereof are aligned.

10. The vehicle according to claim 7, wherein the power connection device comprises:
   a clutch member configured to move in an axial direction of the rotation screw shaft and the power transmission shaft to connect or disconnect the rotation screw shaft and the power transmission shaft; and
   an electric actuator configured to move the clutch member to connect or disconnect the rotation screw shaft and the power transmission shaft.

11. The vehicle according to claim 7, wherein the power connection device comprises:
   a clutch member configured to move in an axial direction of the rotation screw shaft and the power transmission shaft to connect or disconnect the rotation screw shaft and the power transmission shaft; and
   a manual operation device configured to move the clutch member to connect or disconnect the rotation screw shaft and the power transmission shaft.

12. The vehicle according to claim 11, wherein the manual operation device comprises:
   a wire cable connected to the clutch member;
   an operation lever configured to operate to pull or release the wire cable; and
   a restoring spring configured to move the clutch member to a disconnection position.

13. The vehicle according to claim 7, wherein the vehicle is a bicycle, and wherein the vehicle body further comprises an upper frame, a lower frame, a front inclined frame, and a rear inclined frame connected in a rhombus shape.

* * * * *